United States Patent [19]

Cholin

[11] Patent Number: 5,584,319
[45] Date of Patent: Dec. 17, 1996

[54] ELECTRO-OPTICAL VALVE-STATUS SUPERVISION SWITCH CIRCUIT FOR FIRE PROTECTION

[75] Inventor: John M. Cholin, Oakland, N.J.

[73] Assignee: J. M. Cholin Consultants, Inc., Oakland, N.J.

[21] Appl. No.: 506,198

[22] Filed: Jul. 24, 1995

[51] Int. Cl.$^6$ ................................................. F16K 37/00
[52] U.S. Cl. .................... 137/554; 137/551; 137/556
[58] Field of Search ...................... 137/554, 551, 137/556; 73/168

[56] References Cited

U.S. PATENT DOCUMENTS

| | | | |
|---|---|---|---|
| 4,156,437 | 5/1979 | Chivens et al. | 137/554 |
| 4,721,131 | 1/1988 | Ciordinik et al. | 137/554 |
| 5,144,977 | 9/1992 | Eggerton et al. | 137/554 |
| 5,202,673 | 4/1993 | Conrad | 137/554 |
| 5,329,956 | 7/1994 | Mariott et al. | 137/554 |

*Primary Examiner*—A. Michael Chambers
*Attorney, Agent, or Firm*—W. Patrick Quast, Esq.

[57] ABSTRACT

There is described an electro-optical monitoring switch circuit design typically used for fire protection, sprinkler system valves. It comprises a light generating device responsive to a repetitive, pulse signal. Light emitting from the light generating device is directed towards the valve stem portion of the valve. Light emitted by the light generating device is reflected off of the valve stem of the valve in a first position and received by an electro-optical device such as a phototransistor. If the valve stem is moved to close the valve, there is no reflected light. Assuming the first position condition, the phototransistor produces an electrical signal substantially identical to the light generating signal. A phase comparator circuit monitors the output of the phototransistor, comparing it to the signal which excites the light generating device. When the two are synchronous, the comparator circuit produces a similar signal at its output. This obviates false indications due to noise. A further circuit is disclosed, a missing pulse detection circuit, which further inhibits random occurrences of synchronous noise pulses by requiring that a predetermined minimum number of pulses occur in order to ensure that the detected signal is truly the reflected one.

19 Claims, 5 Drawing Sheets

ELECTRO-OPTICAL VALVE-STATUS SUPERVISION SWITCH CIRCUIT FOR FIRE PROTECTION

FIELD OF THE INVENTION

This invention relates generally to valve-status, supervision monitoring devices and particularly to an electro-optical monitoring switch circuit design therefor.

BACKGROUND OF THE INVENTION

Sprinkler systems for fire protection of buildings require valves which shut-off various portions of the sprinkler system to allow work to be done on the system without the flow of water. Traditionally, these valves have represented a serious fire protection problem as they can be accidently or purposely left in the closed position, which deprives the sprinkler system of the water that would be used to suppress a fire. To combat this possibility, the National Fire Codes require that valves for fire protection sprinkler systems be open stem and yoke (OS&Y) valves. This design enables one to visually verify whether the valve is fully open or not.

Many property insurance authorities also require that these valves be electrically monitored in such a way that a "supervisory signal" is transmitted whenever the valve is not in the fully open position. This signal is received by a continuous monitoring station at a remote location. This requirement gave rise to the need for valve-status, supervision switches.

For the past thirty years, valve-status, supervisory switches have consisted of a simple electro-mechanical switch connected to the stem of the valve through a mechanical linkage. Over the years, numerous incremental improvements have been made in the mechanical linkage and the ease of manufacturing these switches. However, the devices have not changed in concept—a mechanical linkage tripping on electro-mechanical switch. The problems with this design concept have persisted regardless of these incremental improvements. The mechanical linkage requires consistently close tolerances between the yoke and stem of the OS&Y valve while the mounting methods require large tolerances to accommodate the wide variations in the sizes of valves and the castings from which they are constructed. Consequently, valve-status, supervision switches have been a constant source of system failures as they rapidly come out of adjustment and render incorrect status indications; fail to report a closure when valves are closed; fail to report an opening when valves are opened; report closure when the valve is open; and, report an open condition when the valve is actually closed. The solution to these failures is almost always the adjustment of the mounting brackets to allow the mechanical linkage to assume the correct position. However, this adjustment often renders the opposite state of the valve unreported.

SUMMARY OF THE INVENTION

The present invention comprises directed light incident means which emits light energy towards and upon a specified area of the valve stem including a reflective surface means. Detection means responsive to reflected light are predeterminately positioned so as to detect light reflected by the reflective surface means. The detection means further includes output means which produces a suitable electrical signal, when the reflective surface means is aligned in the path of the light emitting from the directed light incident means. This alignment typically will signify a valve-open condition.

Means for obviating false indications due to noise are also disclosed. Light-pulse generating means energize the directed light incident means so that the emitted light is pulse-like in nature. Comparator circuit means are disclosed which generate an output electrical signal pulse only when the received, reflected light pulse is synchronous with the generated, light-pulse signal.

Means for detecting a predetermined number of missing pulses is disclosed to further avoid the improbable random occurrence of a noise pulse, synchronous with the generated light-pulse signal. The output of the missing pulse detection means is transmitted to the continuous monitoring station, thus providing a virtual fool-proof status check of the valve's position.

It is therefore a primary object of the invention to provide a fool-proof, electrical, non-mechanical means for correctly determining a sprinkler valve position.

It is a further object of this invention to provide electrical circuit means which include means for obviating erroneous indications of valve position due to extraneous, environmental conditions.

It is still another object of this invention to provide an electrical means to detect valve position which is easily utilized with existing valve monitoring designs.

DESCRIPTION OF THE PREFERRED EMBODIMENT

Figure 1:
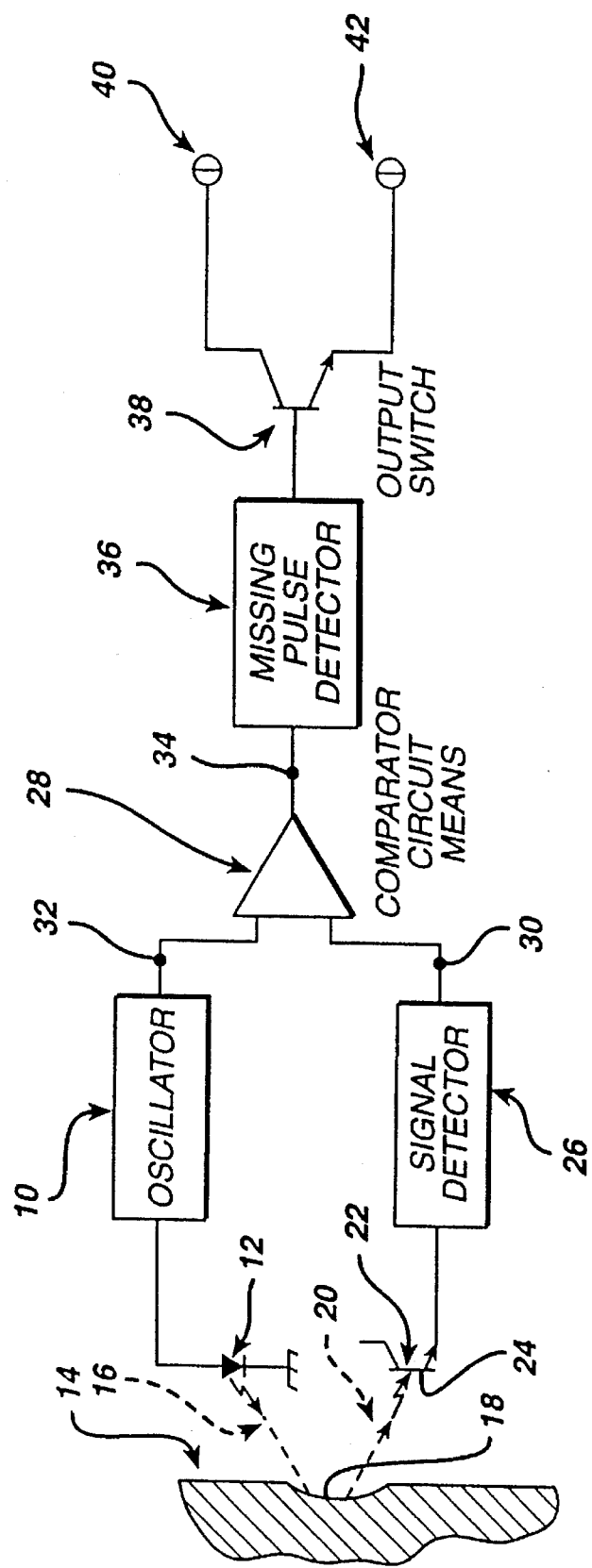
FIG. 1 is a functional schematic of the present invention.

Referring to FIG. 1, directed light incident means including electronic circuit means, for example, oscillator means 10 electrically drives a light generation device 12, for example, a light emitting diode (LED), which responds by emitting a pulse train of light, typically in the infrared range of the spectrum.

The LED is physically positioned in a predetermined manner in relation to the valve stem 14, of a suitable valve employed in fire protection, sprinkler systems. The positioning of the LED is such that the light it emits 16, is reflected off from reflective surface means including a reflective surface 18 on the valve stem. The reflective surface preferably would be formed by a depression on the valve stem such as a semispherical pit or groove. The reflective qualities of the surface can be enhanced, if necessary, by treatment with reflective paint, or using other known techniques. Existing valves employed with the electromechanical switch technology mentioned above, include a grooved stem which cooperates with the switch of the prior art. This same groove can be employed with the present invention. Again, the reflective qualities of the groove can be enhanced as required to optimize the performance of the present invention.

The reflected light 20 impinges upon detection means 22 which includes a an electro-optical responsive device, for example, phototransistor 24, and signal detection means 26.

In order to eliminate the possibility that spurious signals do not give rise to an erroneous indication, comparator circuit means 28 are employed, which is connected to the output 30 of the signal detection means 26 and to a suitable output 32 of the oscillator means 10 which provides a pulse train synchronous with the electrical signal driving the LED. The comparator circuit means will produce a signal at its output 34 only when the signals at each of its inputs are synchronous.

To further obviate the possibility that spurious signals might give rise to a false indication of valve status, missing pulse detection means 36 is connected to the output 34 of the comparator circuit means. The missing pulse detector means 36 issues a signal when a specific number of pulses from the comparator circuit means 28 are missed. This requirement provides for additional stability and reduces the likelihood of a spurious "valve not open" signal. The preferred embodiment requires four pulses to be missed before the missing pulse detector means 36 produces a signal. The output switch 38 will change state at this time. The output switch 38 is connected to supervisory circuit conductors via screw terminals 40 and 42. The operation of the output switch causes a "Supervisory Alarm" in the fire alarm control panel (not shown) to which the present invention is connected via the supervisory circuit conductors.

Figure 2:
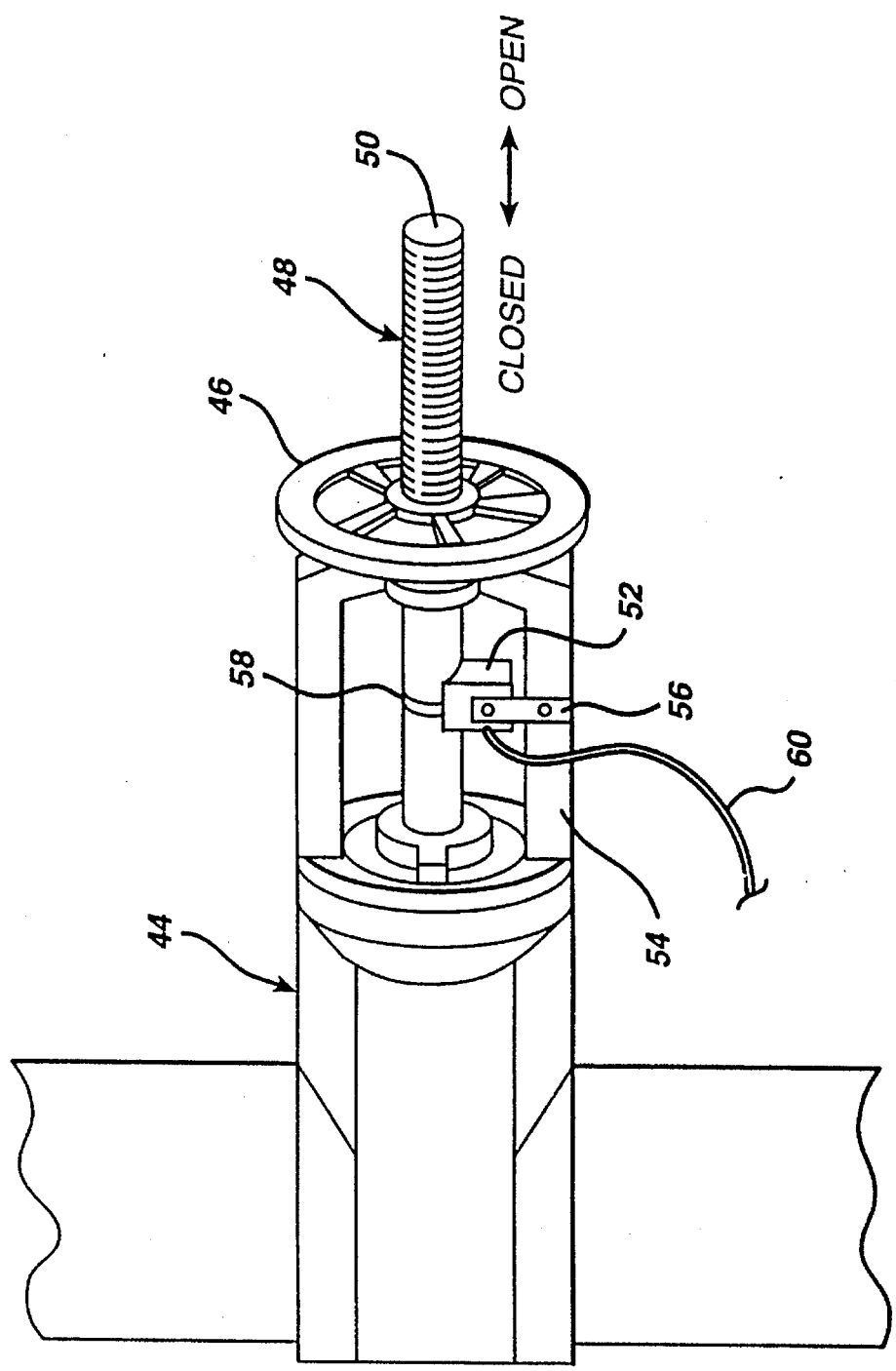
FIG. 2 is a perspective view depicting the physical relationship of the packaged electronic circuitry of the present invention in relation to a typical valve used in a sprinkler system.

FIG. 2 shows a typical OS&Y valve 44 with the optical valve status supervisory switch installed in one possible arrangement. The OS&Y valve 44 is operated with the threaded operating wheel 46 engaging the threads 48 on the stem 50 of the OS&Y valve 44.

Rotating the operating wheel 46 clockwise causes the valve stem 50 to move into the valve, closing it and interrupting the flow of water or opening it to allow the flow of water. The optical valve status supervisory switch 52 is attached to the OS&Y valve yoke 54 via a mounting bracket 56. This mounting bracket 56 positions the optical valve status supervisory switch 52 in relationship to the valve stem 50, so that the reflective pit, target or groove 58 is adjacent to the LED and photocell (not visible on this figure) pair when the valve is in the fully opened state. Thus rotating the operating wheel 46 of the OS&Y valve 44 interrupts the reflective path between the LED 12 and the phototransistor 24 and causes the optical valve status supervisory switch to render an electronic "valve not open" supervisory signal via supervisory circuit conductors 60, connected to output terminals 40, 42.

Figure 3:
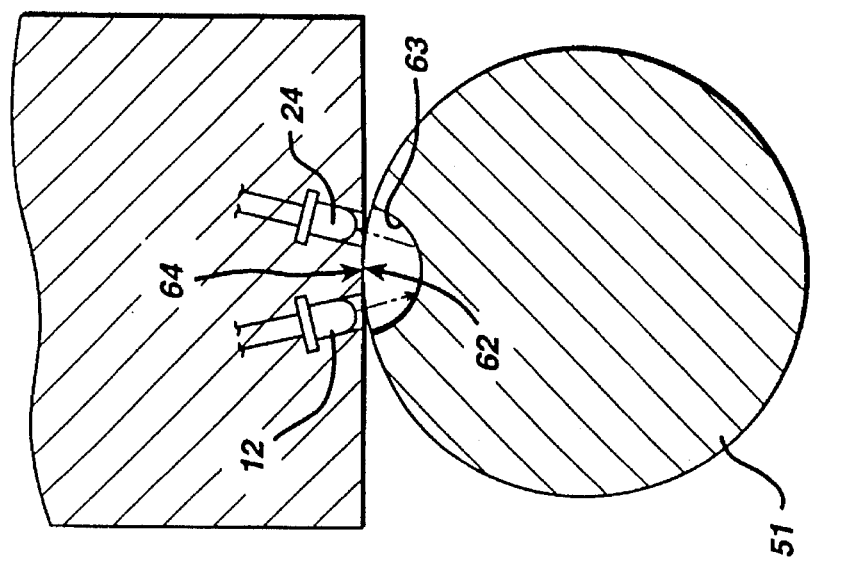
FIG. 3(a) is a schematic, cross sectional view depicting the relationship of the light emitting and light detecting portions of the invention in relation to the reflective surface portion of the valve where the reflective surface portion is a groove.
FIG. 3(b) is a schematic, cross-sectional view depicting the relationship of the light emitting and light detecting portions of the invention in relation to the reflective surface portion of the valve, where the reflective surface portion is a pit.
Figure 3:
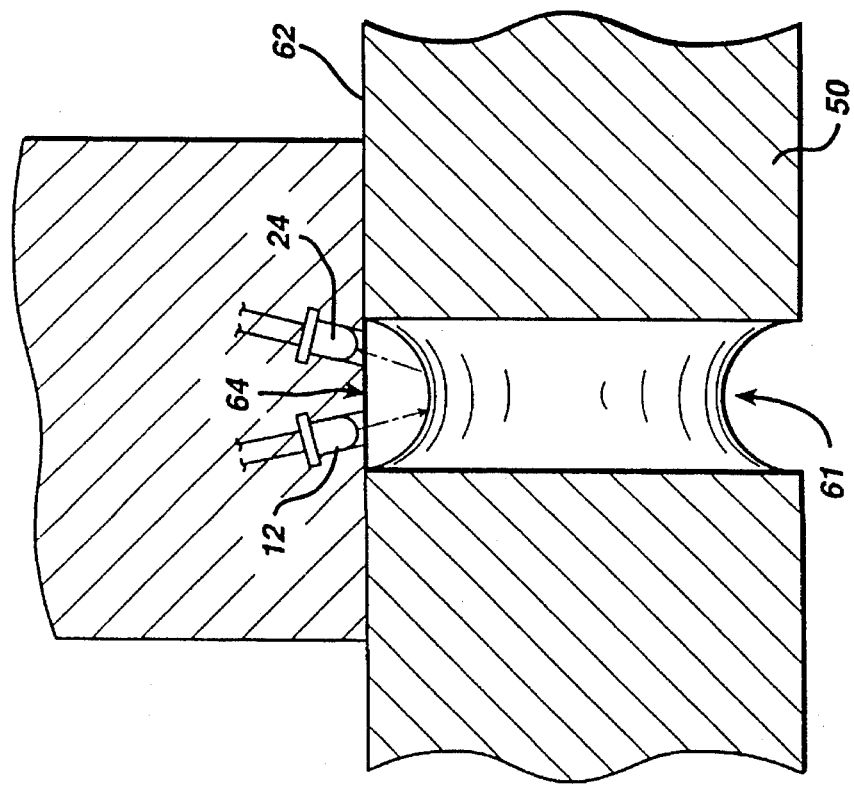

FIGS. 3a and 3b show the orientation of the reflective groove 61 or pit 63 relative to the LED 12 and phototransistor 24. When the valve stem 50 slides horizontally as seen in FIG. 3a, or valve stem 51, into the plane of the paper for FIG. 3b, the top surface 62 (as viewed in FIGS. 3a and 3b) of the valve stem 50 slides horizontally and eventually blocks the light emitted by the LED 12 from being reflected onto the phototransistor 24.

Figure 4:
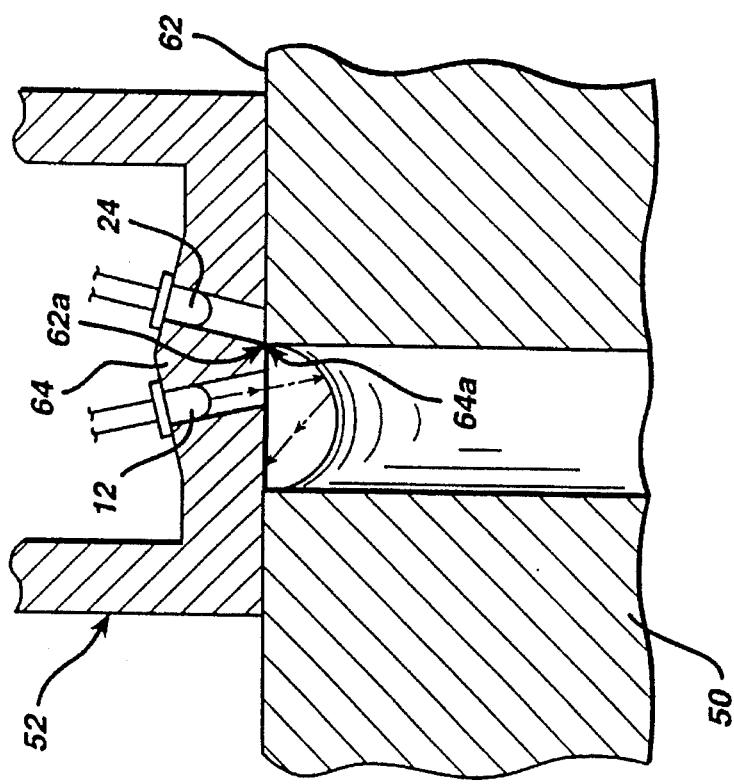
FIGS. 4(a) and 4(b) show the relative position of a grooved valve stem in relation to the optical portions of the invention for a closed and open valve condition.
Figure 4:
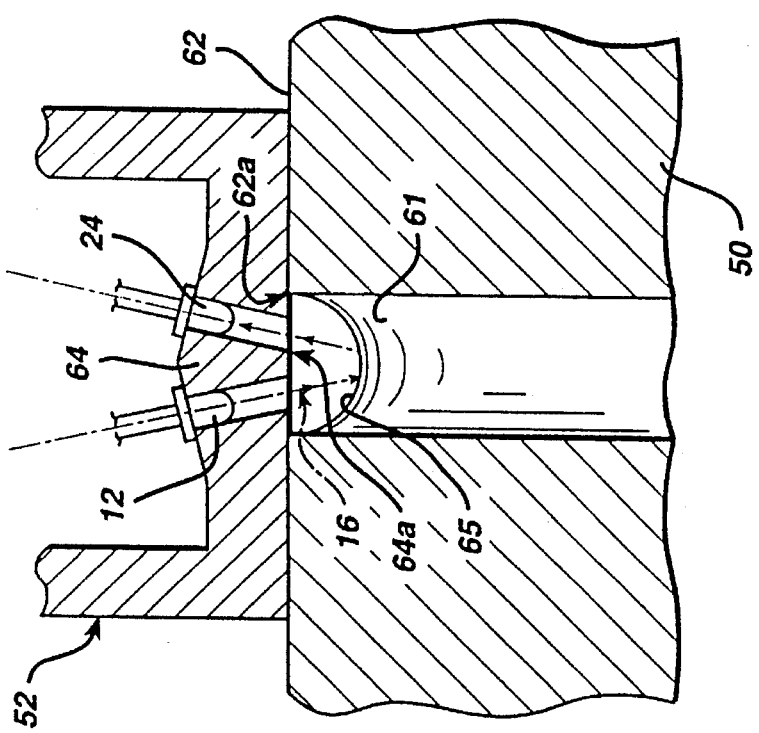

FIGS. 4(a) and 4(b) show the operation of the invention in greater detail where the valve stem 50 includes a groove 61. FIG. 4(a) shows the position of the reflective groove in relation to the LED-phototransistor combination when the valve is open. Light rays 16 emitted by the LED 12 are directed to be incident upon surface 65. They are reflected from that surface, in part recollimated and then directed towards the detection means including phototransistor 24.

When the operating wheel 46 is rotated, the valve stem 50 moves to the left, as viewed in FIG. 4(b). As this occurs, less light is received by the phototransistor 24 until a threshold is reached when the phototransistor no longer responds. This occurs, at least, when the right hand edge 64(a) of light fence portion 64 of the status switch 52 reaches the intersection of the groove surface 65 with the surface 62 at edge 62(a). Thus a positive loss of the reflected light and hence a positive indication of a change in the status of the valve is provided.

An important part of the design concept for the optical valve status supervisory switch of the present invention is to prevent compromising its ability to transmit a valve tamper signal. Since valve status supervisory switches are critical components in protecting buildings from arson they must be designed such that any attempt to compromise the accurate reporting of the status of the supervised valve can only be reported to the fire control station as a tamper indication (equivalent to a valve not fully open). If commercially available reflective optical sensors were used, although there has been no known application of these sensors to this particular usage, an arsonist could slip a surrogate reflective surface between the valve stem and the optical sensor and thus be free to close the valve without the closure being sensed. By using a depression as the reflective surface as described herein, the slipping of a surrogate reflective shim between the sensor and the stem will have the same effect as moving the valve stem and a valve tamper indication will result. While a number of reflective depressions could be made to work, the circular depression is the most efficient as it recollimates the reflected light, thus enhancing the signal to noise ratio and reducing the required electrical current, a definite advantage.

Figure 5:
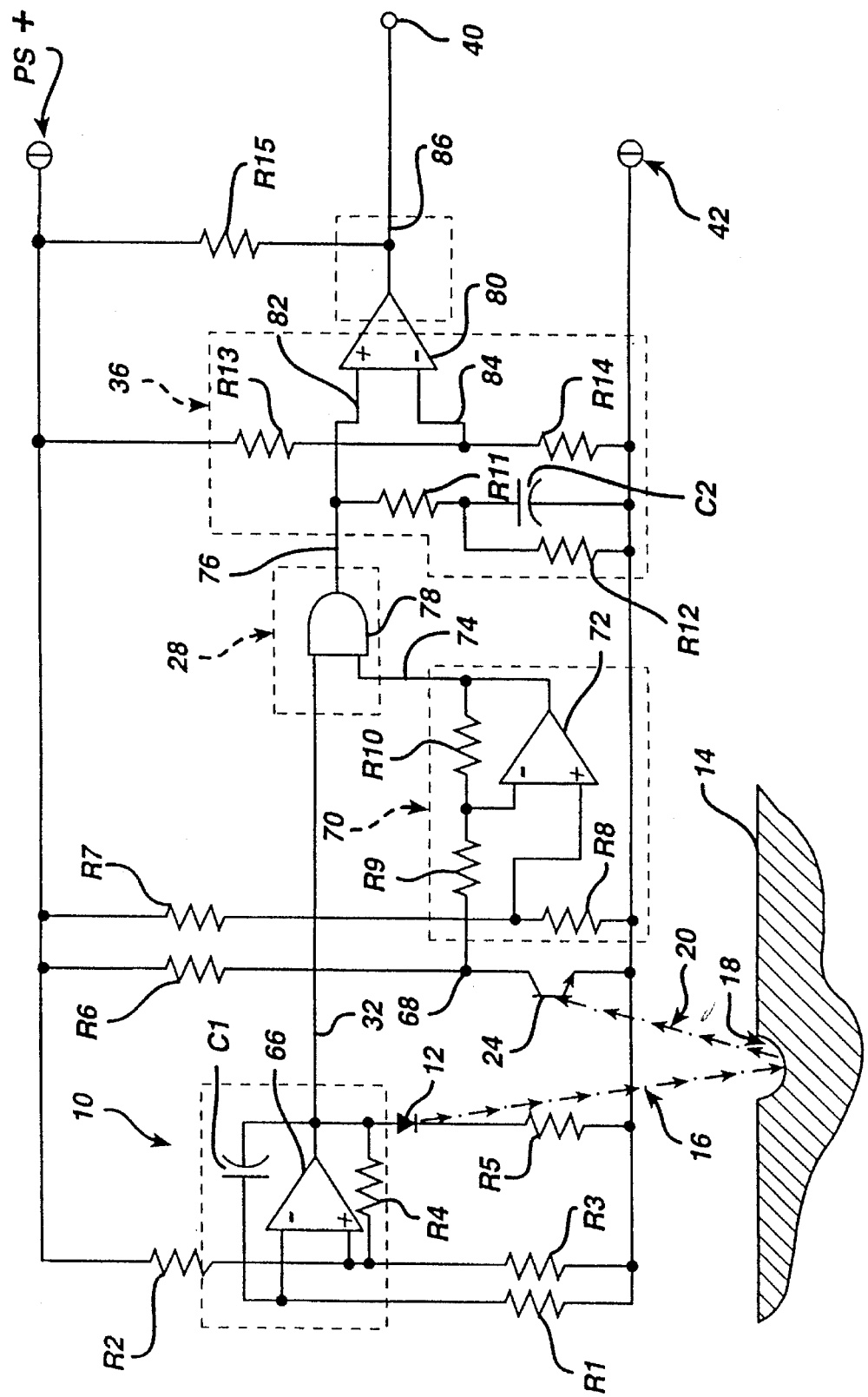
FIG. 5 is a further functional schematic of the present invention including detail circuitry.

FIG. 5 is an electrical schematic of a preferred circuit used with the present invention. The circuit as described refers at different times to the valve stem and groove as identified in FIG. 1. The various elements of the circuitry are powered in a known way from a power supply voltage connected to terminals PS+ and 42.

The oscillator means 10 includes a commercially available operational amplifier 66 such as the LM 124. Numerous types, of course, would be suitable in this application. The input terminals and output terminal of the operational amplifier 66 are connected in a known fashion to various resistors, R1, R2, R3 and R4 and capacitor C1 all of which are appropriately valued to produce a pulse train at output 32 of specified period and pulse width. For example, successful operation of the invention occurs with a pulse width of 2.0 milliseconds and a period of 2.5 seconds. However, these values are not critical to the design and an operable device can be constructed with a wide range of values.

The pulse train at output 32 drives the anode of LED 12, the cathode of which is connected through a current limiting resistor R5 to circuit ground. This, in turn, is connected to terminal 42. Assuming that a valve-open position aligns groove 18 within the field of view of the LED 12 and phototransistor 24, the pulse train of light emitted from the LED, depicted functionally at 16, is reflected off of the groove or pit 18 positioned on the valve stem 14 onto the receiving surface of phototransistor 24.

The phototransistor 24 is powered in a known way through resistor R6. In response to the reception of the reflected pulse train of light it will produce a pulse train output at its collector 68. This is amplified as required by inverter, amplifier circuitry 70 comprising resistors R7, R8, R9 and R10 and op-amp 72 all interconnected in a known fashion to produce a signal at output 74 which is in phase with the signal at output 32 of the oscillator means 10. The output 74 of the amplifier feeds one input of comparator circuit means 28. The other signal input to the comparator circuit means is supplied by the oscillator means 10—the signal appearing on output 32. Comparator circuit means 28 produces a signal at its output 76 when the two signals at its input are synchronous. Comparator circuit means 28 can be simply implemented using a two input "AND" gate 78 such as the CD 4081, which will only produce an output when the two signals received are in phase. Of course, other circuit techniques for implementing the comparator function can be employed.

"Missing pulse" detector means 36, suitable for the purposes of the invention, can be constructed with a resistor-capacitor integration circuit formed by resistors R11, R12 and capacitor C2 and a commercially available op-amp, 80, again, such as the LM 124. These are all interconnected in a known way to produce a change of electrical state at output 40 when a predetermined number of pulses fail to appear at output 76. When that occurs the voltage at input 82 of the op-amp 80 drops below the voltage set at input 84 by resistors R13 and R14 resulting in a change of state at output 40.

In the preferred embodiment, I have selected component values for the integration circuit which would result in a changed output at terminal 40 when four pulses are "missed". This would typically occur when the valve is moved to a closed condition, so that the groove 18 passes out of the field of view of the LED or phototransistor.

The output stage of the missing pulse detector and more specifically, the op-amp 80 serves as the output switch shown, functionally, as 38 in FIG. 1. The output switch as noted earlier is connected to supervisory circuit conductors 60 via terminals 40 and 42. The operation of the output switch responding to the "missed" pulses, causes a "supervisory alarm" in the fire alarm control panel to which the subject invention is connected through terminals 40 and 42 and conductors 60, so that the system operator is apprised of a closed valve condition.

There are a number of other "missing pulse" detector circuit techniques that could be employed so that it is to be understood that the exact circuit is not critical to the operation of the invention. Further, other circuit techniques can be substituted for those described.

The term "light" as used throughout and in the claims, is to be construed in a broader sense, and not the narrower construction of just the visible spectrum. So, for example, as noted above, the emitted pulse train of light typically, and preferably because of the lower power demand, is in the infrared range of the spectrum.

Alternate ways of implementing the invention can be employed, all without departing from the spirit of the invention, whose scope is only to be limited by the claims as set forth below.

What is claimed is:

1. A safety valve for use in sprinkler systems comprising:

(a) a valve including a body portion and stem portion;
    (b) directed light incident means for emitting rays of light;
    (c) reflective surface means;
    (d) light detection means for detecting rays of light;
    said stem portion including said reflective surface means forming a part thereof,
    said directed light incident means and said light detection means physically positioned in relation to said reflective surface means such that the emitted rays of light impinge upon said reflective surface means and are reflected thereby towards said light detection means only in a first position of said valve stem, said valve stem operative to move in relation to said valve body and to said directed light incident means and said light detection means to a position other than said first position such that said emitted rays of light do not impinge upon said reflective surface means and are thus not reflected towards said light detection means at said position other than said first position; and
    (e) means to indicate the detection of reflected light by said light detection means, whereby the position of said valve stem at said first position or at said position other than said first position is indicated by said means to indicate.

2. The safety valve claimed in claim 1 wherein said valve is an open stem and yoke valve (OS&Y) and where said valve is used in a sprinkler system forming a part of a fire protection system.

3. The safety valve claimed in either claim 1 or claim 2, wherein said reflective surface means comprises a depression in said stem.

4. The safety valve claimed in either claim 1 or claim 2 wherein said directed light incident means includes:

(a) electronic circuit means; and
    (b) a light generating device;
    said electronic circuit means including a first output where a first electrical signal is present, said output electrically connected to said light generating device, said light generating device emitting said rays of light responsive to said first electrical signal;
    said light detection means including:
    (c) an electro-optical responsive device electrically responsive to the impingement thereon of rays of light, said means to indicate including:
    (d) an electronic detection circuit means electrically connected to said electro-optical responsive device;
    said electronic detection circuit means, including a second output, said electronic detection circuit means producing an electrical signal at the second output when said valve stem is in said first position.

5. The safety valve claimed in claim 4, further comprising circuit means to minimize the possibility that spurious signals do not give rise to the erroneous indication of the detection of reflected light.

6. The safety valve claimed in claim 4 wherein said reflective surface means comprises a depression in said stem.

7. The safety valve claimed in claim 5 wherein said reflective surface means comprises a depression in said stem.

8. An electro-optical, valve-status circuit device for use with a valve including a body portion and stem portion, said circuit device comprising:

(a) reflective surface means disposed on said valve stem;
    (b) directed light incident means for emitting rays of light, including:

(i) electronic circuit means, and
(ii) a light generating device;
said electronic circuit means including a first output where a first electrical signal is present, said output electrically connected to said light generating device, said light generating device emitting said rays of light responsive to said first electrical signal;

(c) light detection means for detecting rays of light including,
(i) an electro-optical responsive device electrically responsive to the impingement thereon of rays of light, and
(ii) an electronic detection circuit means electrically connected to said electro-optical responsive device, said electronic detection circuit means including a second output,
said light generating device and said electro-optical responsive device physically positioned in relation to said reflective surface means such that the emitted rays of light impinge upon said reflective surface means and are reflected thereby towards said electro-optical responsive device in a first position of said valve stem,
said valve stem operative to move in relation to said valve body and to said light generating device and said electro-optical responsive device to a position other than said first position such that said rays of light do not impinge upon said reflective surface means and are thus not reflected towards said electro-optical responsive device at said valve stem position other than said first position,
said electronic detection circuit means producing a second electrical signal at the second output when said valve stem is in said first position.

9. The valve-status circuit device claimed in claim 8 further comprising circuit means to minimize the possibility that spurious signals do not give rise to the erroneous indication of the detection of reflected light.

10. The valve-status circuit device claimed in either claim 8 or claim 9, wherein said reflective surface means comprises a depression in said stem.

11. The valve-status circuit device claimed in claim 9 wherein said circuit means to minimize the possibility that spurious signals do not give rise to the erroneous indication of the detection of reflected light include:

(a) comparator circuit means including a first and second input and a third output, each of said inputs electrically connected, respectively, to said first output and said second output, said comparator circuit means adapted to produce a third electrical signal at said third output, only when a characteristic of said second electrical signal, relatable to a substantially similar characteristic of said first electrical signal, is confirmed by said comparator circuit means as present in said second electrical signal.

12. The valve-status circuit device claimed in claim 11 wherein said comparator circuit means includes an AND gate, wherein said third electrical signal is produced only when said first and second electrical signals are in phase.

13. The valve-status circuit device claimed in either claim 11 or claim 12 wherein said reflective surface means comprises a depression in said stem.

14. The valve-status circuit device claimed in claim 9 wherein said circuit means to minimize the possibility that spurious signals do not give rise to the erroneous indication of the detection of reflected light include:

(a) missing pulse detector means, including an output, and wherein,
said electronic circuit means included in said directed light incident means is an oscillator circuit means such that said first electrical signal is a repetitive electrical signal, each cycle having identical characteristics,
said missing pulse detector means adapted to compare certain characteristics of said second electrical signal and substantially similar characteristics of said first electrical signal,
said missing pulse detector adapted to produce a change in the electrical signal at its output when the compared characteristics of said second electrical signal do not match the same characteristics of said first signal, according to predetermined criteria, over a predetermined minimum number of cycles of said first signal.

15. The valve-status circuit device claimed in claim 14 wherein said reflective surface means comprises a depression in said stem.

16. The valve-status circuit device claimed in claim 14 wherein said missing pulse detector means further includes:

(a) comparator circuit means, including a first and second input and a third output,
each of said inputs of said comparator circuit means electrically connected, respectively, to said first output and said second output, said third output connected to an input of said missing pulse detector means,
said comparator circuit means adapted to produce a third electrical signal at said third output only when a characteristic of said second electrical signal, relatable to a substantially similar characteristic of said first electrical signal, is confirmed by said comparator circuit means as present in said second electrical signal.

17. The valve-status circuit device claimed in either of claims 11, 12 or 14, wherein said repetitive electrical signal is a pulse signal having a predetermined width and period.

18. The valve-status circuit device claimed in claim 16 wherein said first signal, said repetitive electrical signal, is a pulse signal having a predetermined width and period;
said second electrical signal having substantially the same pulse width and period as said first signal when said valve stem is in said first position;
said comparator circuit means comprises an AND gate, said comparator circuit means producing a pulse signal of similar width and period as said first and second signals when said valve stem is in said first position;
wherein said missing pulse detector is adapted to produce a change in its output if the output of said comparator circuit means, the third output, does not produce said pulse signal of similar width and period after a predetermined number of cycles of said repetitive electrical signal.

19. The valve-status circuit device claimed in claim 18 wherein said reflective surface means comprises a depression in said stem.

* * * * *